(12) United States Patent
Grunberger

(10) Patent No.: US 8,589,789 B2
(45) Date of Patent: Nov. 19, 2013

(54) METHOD AND SYSTEM FOR REVISITING PRIOR NAVIGATED PAGES AND PRIOR EDITS

(76) Inventor: Aaron Grunberger, Brooklyn, NY (US)

( * ) Notice: Subject to any disclaimer, the term of this patent is extended or adjusted under 35 U.S.C. 154(b) by 233 days.

(21) Appl. No.: 12/849,661

(22) Filed: Aug. 3, 2010

(65) Prior Publication Data

US 2012/0036456 A1   Feb. 9, 2012

(51) Int. Cl.
*G08B 13/14* (2006.01)

(52) U.S. Cl.
USPC .......... 715/234; 715/853; 715/854; 715/855; 707/802

(58) Field of Classification Search
USPC .......................................... 715/234
See application file for complete search history.

(56) References Cited

U.S. PATENT DOCUMENTS

| | | |
|---|---|---|
| 2001/0035885 A1 | 11/2001 | Iron et al. |
| 2002/0138582 A1 | 9/2002 | Chandra et al. |
| 2003/0093790 A1 | 5/2003 | Logan et al. |
| 2003/0145281 A1 | 7/2003 | Thames et al. |
| 2003/0145282 A1 | 7/2003 | Thomas et al. |
| 2003/0145310 A1 | 7/2003 | Thames et al. |
| 2003/0163801 A1 | 8/2003 | Thames et al. |
| 2003/0196094 A1 | 10/2003 | Hillis et al. |
| 2004/0003351 A1 | 1/2004 | Sommerer et al. |
| 2004/0139143 A1* | 7/2004 | Canakapalli et al. ......... 709/200 |
| 2004/0186817 A1 | 9/2004 | Thames et al. |
| 2004/0189713 A1 | 9/2004 | Thames et al. |
| 2004/0199516 A1 | 10/2004 | Thames et al. |
| 2005/0132297 A1 | 6/2005 | Milic-Frayling et al. |
| 2005/0132305 A1 | 6/2005 | Guichard et al. |
| 2005/0198247 A1 | 9/2005 | Perry et al. |
| 2005/0257400 A1* | 11/2005 | Sommerer et al. ................ 36/13 |
| 2006/0064313 A1 | 3/2006 | Steinbarth et al. |
| 2007/0211071 A1 | 9/2007 | Slotznick et al. |
| 2008/0092168 A1 | 4/2008 | Logan et al. |
| 2008/0104032 A1 | 5/2008 | Sarkar |
| 2010/0005053 A1* | 1/2010 | Estes ................................. 707/1 |
| 2010/0131835 A1 | 5/2010 | Kumar et al. |
| 2010/0157989 A1 | 6/2010 | Krzyzanowski et al. |
| 2010/0157990 A1 | 6/2010 | Krzyzanowski et al. |
| 2010/0159898 A1 | 6/2010 | Krzyzanowski et al. |
| 2011/0066982 A1* | 3/2011 | Paulsami et al. .............. 715/835 |
| 2011/0289459 A1* | 11/2011 | Athans et al. ................. 715/854 |

* cited by examiner

*Primary Examiner* — Doug Hutton, Jr.
*Assistant Examiner* — Zaida I Marrero

(57) ABSTRACT

A system and method for navigating or editing may include storing multiple forward or redo stacks and a single back or undo stack. The forward or undo stacks may include separate stacks for each page from which navigation occurs to a page of lower hierarchical level or for each operation for which another operation is subsequently performed. Positions of references in the forward or redo stacks may be modified in response to navigations or edits to place a last navigated page or operation at the top of the stack. The timing of such movement of references may be optimized.

15 Claims, 3 Drawing Sheets

METHOD AND SYSTEM FOR REVISITING PRIOR NAVIGATED PAGES AND PRIOR EDITS

FIELD OF THE INVENTION

The present invention relates to a system and method for re-navigating previously navigated pages according to multiple navigation branches from a source page. The present invention also relates to editing a document by reactivating prior edits according to multiple historic edit branches from a single source point.

BACKGROUND

Web browsing is performed for many reasons. A significant purpose is for research. Research often requires accessing many pages of documents according to a logical succession. The logical succession from any one page may lead to multiple parallel branches. Navigation from one page to another via web browsing is often based on such logical connections. From any one page, a user may navigate at different times to different other pages, the different navigations representing parallel navigation paths. However, when a user navigates from a first page of a first hierarchical level to a page of a lower hierarchical level, back to the first page of the first hierarchical level, then to a different page of the lower hierarchical level, and then back to the first page of the first hierarchical level, selection of a forward button leads only to the last of the navigated to pages of the lower hierarchical pages, i.e., only to a page of a last accessed one of the parallel paths. Prior branches of navigation to other lower hierarchical pages are therefore lost. A user cannot therefore recover, via use of directional navigation buttons, earlier navigation branches.

SUMMARY

Example embodiments of present invention provide for enhanced navigation between pages, such that historic navigation branches may be revisited even after replacement of the historic navigation branches with an updated navigation branch.

For example, a user may visit a first page, e.g., a webpage, of a first hierarchical level. From the first page, the user may navigate to a second page of a second hierarchical level that is lower than the first hierarchical level, where height of the hierarchical level is determined based on closeness to an initial first source page, the initial first source page being of the highest hierarchical level. The first source page may be, for example, the page opened upon opening of the application in which the pages are presented. For example, the initial first source page may be a home page presented upon opening a web browser, or, where no home page is presented, the initial page presented after opening the web browser. Opening the web browser may refer to where the web browser application is launched, or where a new web browser window or tab is opened.

After navigation to the second page, the user may press a "back," button, e.g., a button with an arrow pointing to the left, e.g., a graphical button displayed in a computer screen, which may be pressed, e.g., via keyboard, mouse click, or any other suitably appropriate user input method, to navigate back to the first page.

Subsequently, from the first page, the user may navigate to a third page. Navigation may be, for example, by selecting a link, such as a Uniform Resource Locator (URL) link, or by manually entering a webpage address. From the third page, the user may navigate back to the first page, e.g., by selecting the "back" button. Subsequently, the user may navigate from the first page to either of the second and third pages based on the historic navigation to those pages.

In an example embodiment, the system and method of the present invention may provide for the historic navigation by presenting options to the user for selecting either the second or third page. The options may be presented in response to selection by the user of a button for navigating to a lower hierarchical level page from the first page.

For example, the user may select a "forward" button, e.g., a button showing an arrow pointing to the right, e.g., a graphical button displayed on the computer screen. In response to selection of the "forward" button, the system may present a list of the pages satisfying the two conditions that (1) the pages are of the hierarchical level immediately below the level of the page from which the "forward" button was selected, and (2) that the pages were previously navigated to from the page from which the "forward" button was selected. In an example embodiment, the second condition may be on a browser session basis, such that if a page was previously navigated to from the first page in a prior session and not in the present browser session, the page would not be presented in the list.

Alternatively, inter-session navigation may also be accounted for, so that even pages navigated to in prior sessions and not in a current session are presented in the list. According to this embodiment, a limit may be placed on the number of pages to be presented, e.g., by page number, or session number. For example, only pages of a predetermined number of prior sessions may be presented. In one example, according to this embodiment, inter-session navigation may be accounted for only for navigation from pages other than a home page presented upon opening the web browser. This condition may be imposed since a relationship between the navigations may not be assumed, the navigation in each case from the home page being required.

(It is noted that a page number limit may be placed even according to the embodiment that provides in the list only those pages that are of the current session, e.g., based on memory constraints. The limit may be further constrained for readability of the list. For example, too many pages presented in the list may be an information overload for a user. Where a page limit is imposed, a first-in-first-out (FIFO) approach may be used, such that the earliest prior pages are not included in the list.)

The user may select on of the pages of the list, in response to which selection, the system and method of the present invention may display the selected page.

Accordingly, continuing the example above, when the user selects the "forward" button from the first page, the system and method may responsively display a list of the second and third pages. The user may select one of those pages from the list, in response to which selection, the system and method may present the selected page.

In an example embodiment of the present invention, the list may be displayed as a set of selectable snapshot images of the pages, e.g., thumbnail images.

In an example embodiment of the present invention, the list may include only those pages that are of an immediate lower hierarchical level than that of the page from which the "forward" button was selected, pages of even lower hierarchical level being omitted. For example, if the user previously had navigated from the third page to a fourth page, the fourth page may be omitted.

In an alternative example embodiment, the system and method may display even pages of lower hierarchical level in order to provide the user for a navigation map to help the user decide which page to select. For example, the user may decide to select the third page in order to then be able to select the "forward" button from the third page to reach the fourth page. In an example, the non-immediately lower hierarchical level page may noT be selectable from the list. For example, although the fourth page is included in the list presented in response to selection of the "forward" button from the first page, the fourth page may be non-selectable. In an alternative example embodiment, all listed pages may be selectable, regardless of degree of separation of the page from the currently active page.

According to the example embodiment in which lower hierarchical pages that are not of the immediately lower hierarchical level than the currently active page are displayed, a limit may be placed on the degree of separation of the page from the currently active page in order for the page to be displayed in the list. For example, if 4 is selected as the maximum degree of separation, then any page that is five hierarchical levels lower than the currently active page may be omitted from the list.

A condition for inclusion in the list may be that the page is part of a direct navigation change stemming from the currently displayed page in which the "forward" button was selected, and the list may be presented regardless of the hierarchical level of the currently displayed page from which the "forward" button is selected. For example, if the "forward" button is selected while a page of a third hierarchical level is displayed, then the pages of the fourth (and lower, depending on the embodiment) hierarchical level to which the user had previously navigated from the currently active page may be displayed in the list.

According to an example embodiment of the present invention, in response to selecting the "forward" button, the system and method may responsively navigate to the last of the pages of the immediately lower hierarchical level to which the user navigated from the currently active page, without display of a list. According to this embodiment, the system and method may present a third navigation button (aside from the first two navigation buttons, i.e., the "back" and "forward" buttons). In response to selection of the third navigation button, the system may navigate to a different one of the pages of immediately lower hierarchical level than the currently active page to which the user previously navigated. Upon first selection of the third navigation button, the system and method may display a second to last one of the pages of lower hierarchical level than the currently active page to which the user previously navigated. Upon second selection of the third navigation button, the system and method may display a third to last one of the pages, etc. This may continue until an earliest of the prior pages of immediately lower hierarchical level to which the user navigated from the currently active page is displayed. According to an example embodiment, at that point, the third navigational button may be disabled. A fourth navigational button may be used for navigating in a reverse direction towards the last of the pages visited by navigation from the higher hierarchical level. According to an alternative example embodiment, the third navigational button may continue to be enabled, and further selection of the button may cycle back around to the last visited on of the pages (which would also be displayed upon selection of the "forward" button), and continue further through the cycle again. Even according to this embodiment, the fourth navigational button may be selected for reversing direction towards the latest of the pages visited from the higher hierarchical level.

Upon display of a page in response to the selection of the third navigational button, the user may select whether to set the displayed page as a currently active page. For example, the system and method may display a button which may be selected for setting the displayed page as the currently active page. Alternatively, a different user input may be provided for setting the page, e.g., a keyboard button or button combination may be keyed in, or certain mouse clicks may be used. The setting of the page may be in order to allow for further selection of the third navigational button to be considered navigation to a page of a lower hierarchical level than the set page. Otherwise, the navigation would be considered to be to other pages navigated to from the previous page.

Upon setting of a page, the set page may be moved in its order to be considered the latest page to which the user navigated from the higher hierarchical level page. For example, if the user visits from page 1 to page 2, then from page 1 to page 3, and then from page 1 to page 4, the "forward" page may lead to page 4, and the third navigational button may first lead to page 3, and then page 2. However, if the user then sets page 2, then after selecting the "back" button to navigate back to page 1, the "forward" button leads to page 2, and the third navigational button first leads to page 4, and then page 3.

Alternatively, the third navigational button may be disabled until the "forward" button is selected. For example, continuing the example above, from the first page, the user may select the "forward" button, in response to which the third page is displayed. The third navigational button may then become active for selection to select the second page. Similarly, the fourth navigational button may then become active.

According to this embodiment, the order of navigated pages does not change until the user selects the "back" button to navigate to the higher hierarchical level page. For example, if the user navigates from page 1 to page 2, back to page 1, and then to page 2, back to page 1, and then to page 3, back to page 1, and then to page 4, then the "forward" button is associated with page 4, the first selection of the third navigational button with page 3, and the second of its selections with page 2. If, after selection of the third navigational button to page 3, the user hits the "back" button leading to page 1, then page 3 is considered the last visited page from page 1, and page 4 is considered the second to last page visited, etc. If after selection of the third navigational button to page 2, the user selects the "back" button leading to page 1, then page 2 is considered the last page visited, page 4 is considered the second to last page visited from page 1, and page 3 is considered the third to last page visited from page 1. Thus, according to this embodiment, the order is changed only in response to selection of a back button.

Thus, according to an example embodiment of the present invention, the system and method may, for each respective page from which the user navigates directly to a plurality of pages of one lower hierarchical level, record an order in which those pages of lower hierarchical level were visited, and, in response to each navigation from the pages of lower hierarchical level to the respective page, the system and method may change the order to indicate the latest page from which the user navigated to the respective page as being the last visited page (if the latest page was not already indicated in the stack as being the last visited page). A forward button may be associated with the last visited page of the order. Upon selection of the forward button, another navigational button becomes active to select others of the visited pages according to the recorded order towards the earliest visited, such that the earlier the page was visited the later the page is loaded in response to the navigational button. A second other navigational button may also become active upon selection of the forward page to move through the order in a direction reverse of the first other navigational button. For example, after the "forward" button is selected, selection of the second other navigational button may initially cause the first visited page to be loaded, and the next selection of the button may cause the second visited page to be loaded, etc. Furthermore, if the second other visited page is selected when the second to last visited page is displayed, the selection may cause the last visited page to be displayed.

In an alternative example embodiment, the second other navigational button may become active at the same time as the first other navigational button, and the stack of page references traversed in response to the other navigational buttons may be operated as a ring memory as further described below.

In an example embodiment of the present invention, the stacks may be used for presenting a listing of selectable operations corresponding to parallel redo branches, for example, in a word processing environment, as explained in detail below.

DETAILED DESCRIPTION

Example embodiments of the present invention provide a system an method for navigation of pages along multiple parallel branches of a navigation history. The pages may be, for example, webpages navigated via a web browser application in a web browser window displayed on a computer display, the web browser application being stored in a hardware memory device and executed by a computer processor.

In order to provide for navigation along multiple parallel branches, the processor executing a history navigation application, separate from or integrated with the web browser application, may store in memory multiple forward stacks for a single browsing session. (In an example embodiment, the stacks may span navigation of multiple sessions, for example, that are run successively, or even concurrently.) Although, the processor may store multiple forward stacks, in an example embodiment, the processor maintains only a single back stack for a single browsing session. Because multiple forward stacks are maintained, each associated with a single respective page and including pages of lower hierarchical level navigated to from the respective page, backward navigation may be separately performed based on the separate back stack.

Figure 1:
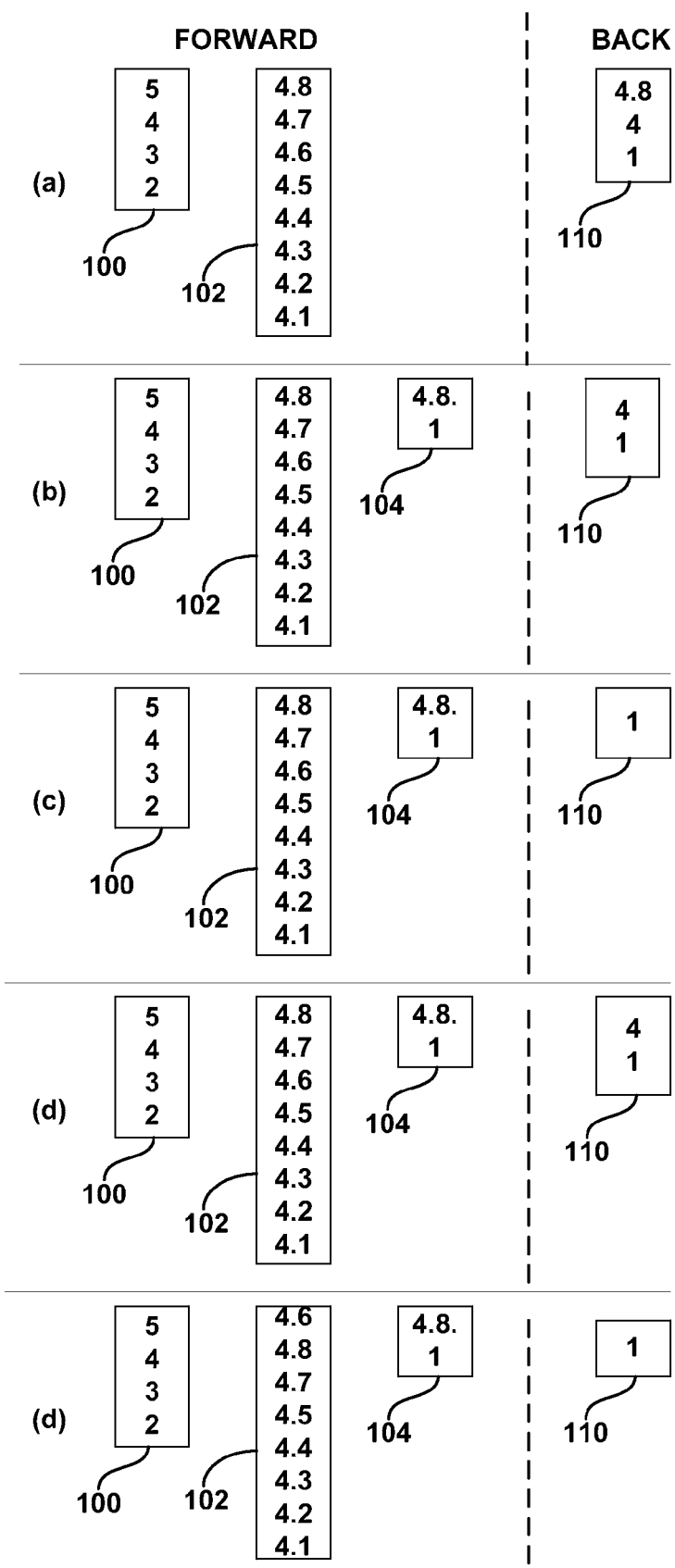
FIG. 1 shows stack states according to an example embodiment of the present invention.

The plurality of forward stacks may include a respective forward stack for each visited page from which further navigation occurred to a page of lower hierarchical level. FIG. 1 shows the states of forward and back stacks at various navigation steps, according to an example embodiment o the present invention. Part (a) shows the state of forward stacks 100 and 102, and of back stack 110, where a hierarchical succession of a latest navigation string is from page 1 to page 4 to page 4.8 to page 4.8.1, and assuming previous navigations to pages 2, 3, and 5 from page 1, and to pages 4.1-4.7 from page 4. In stack 100, page 4 remains at the second stack position even though it is the last page navigated to from page 1 because shifting of the position of a visited page to a top of the stack occurs in response to a backward navigation to a higher hierarchical page.

Part (b) shows the state of the forward stacks 100 and 102, the back stack 110, and a further forward stack 104, where a backward navigation occurred from the state represented in part (a). In response to the back navigation command, a reference to page 4.8.1 is stored in the forward stack 104, page 4.8 is displayed, and the reference to page 4.8 in back stack 110 is removed. The backward navigation to page 4.8 occurs by loading the page referenced at the top-most position of the back stack 110. Since page 4.8 was previously referenced at the top of the back stack 110, it is the page that is displayed. Forward stacks 100 and 102 remain unchanged.

In an example embodiment of the present invention, a pointer may be stored to an active position of the forward stack including the reference to a currently displayed page. Each such stack position may further point to a stack of lower hierarchical pages. For example, in the state of part (b), a pointer may be stored to the stack position of forward stack 102 including the reference to page 4.8. Accordingly, should the processor receive a forward navigation instruction, the processor may refer to the stack pointed to by position the stack position having the reference to page 4.8, i.e., stack 104, and may accordingly load the page referenced by the topmost position of stack 104, i.e., page 4.8.1.

Referring back to the example navigation sequence described in connection with the stacks illustrated in FIG. 1. part (c) shows the state of the forward stacks 100, 102, and 104, which remain unchanged from the state shown in part (b), and shows the state of the back stack 110, where a backward navigation occurs from page 4.8 to page 4. In response to the back command, the processor removes the reference to page 4 from the back stack 110. Although page references are removed from the back stack 110 when backward navigation occurs, in an example embodiment, page references are not removed from the forward stacks when forward navigation occurs in order to maintain the position of the page in the forward stack.

Part (d) of FIG. 1 shows the state of the forward stacks 100, 102, and 104, which remain unchanged from the state shown in part (c), and shows the state of the back stack 110, where a forward navigation occurs from page 4 to page 4.6. In response to forward command, the processor adds the reference to page 4 into the back stack 110.

Part (e) of FIG. 1 shows the state of the forward stacks 100, 102, and 104, and of the back stack 110, where a backward navigation occurs from page 4.6 to page 4. As shown, in response to the back navigation command, page 4 is displayed based on the reference in the top position of the back stack 110 (as of its state shown in part (d)), the reference to page 4 is removed from the back stack 110, and the reference to page 4.6 is removed from its third position in the forward stack 102 and placed at the top position of the forward stack 102. Accordingly, in response to a further forward navigation command, the processor would initially display page 4.6 since it has been placed at the top of the forward stack 102.

In an alternative example embodiment of the present invention, a page reference may be moved to the top position of the stack in response to (1) backward navigation from the referenced page and also in response to (2) forward navigation from the referenced page or subsequent backward navigation from the referenced page. However, the inventor has discovered that it is more advantageous to move the page reference to the top of the stack only in response to backward navigation from the referenced page to a page of a higher hierarchical level, as this would allow for a more fluid navigation of other pages of the same hierarchical level as that of the referenced page where backward navigation from the referenced page does not occur.

For clarity, FIG. 1 shows only forward stacks 100, 102, and 104. However, additional forward stacks may be stored, e.g., associated with the same browsing session. For example, the processor may store in memory additional forward stacks for each or some of pages 2, 3, and 5, just as the processor stores in memory stacks 102 and 104 for page 4. Additionally, the processor may store in memory additional forward stacks for each or some of pages 4.1-4.7, just as the processor stores in memory stack 104 for page 4.8. Additionally, the processor may store a forward stack for page 4.8.1 to pages of lower hierarchical level than page 4.8.1 if navigation occurred from page 4.8 to page 4.8.1.

Figure 2:
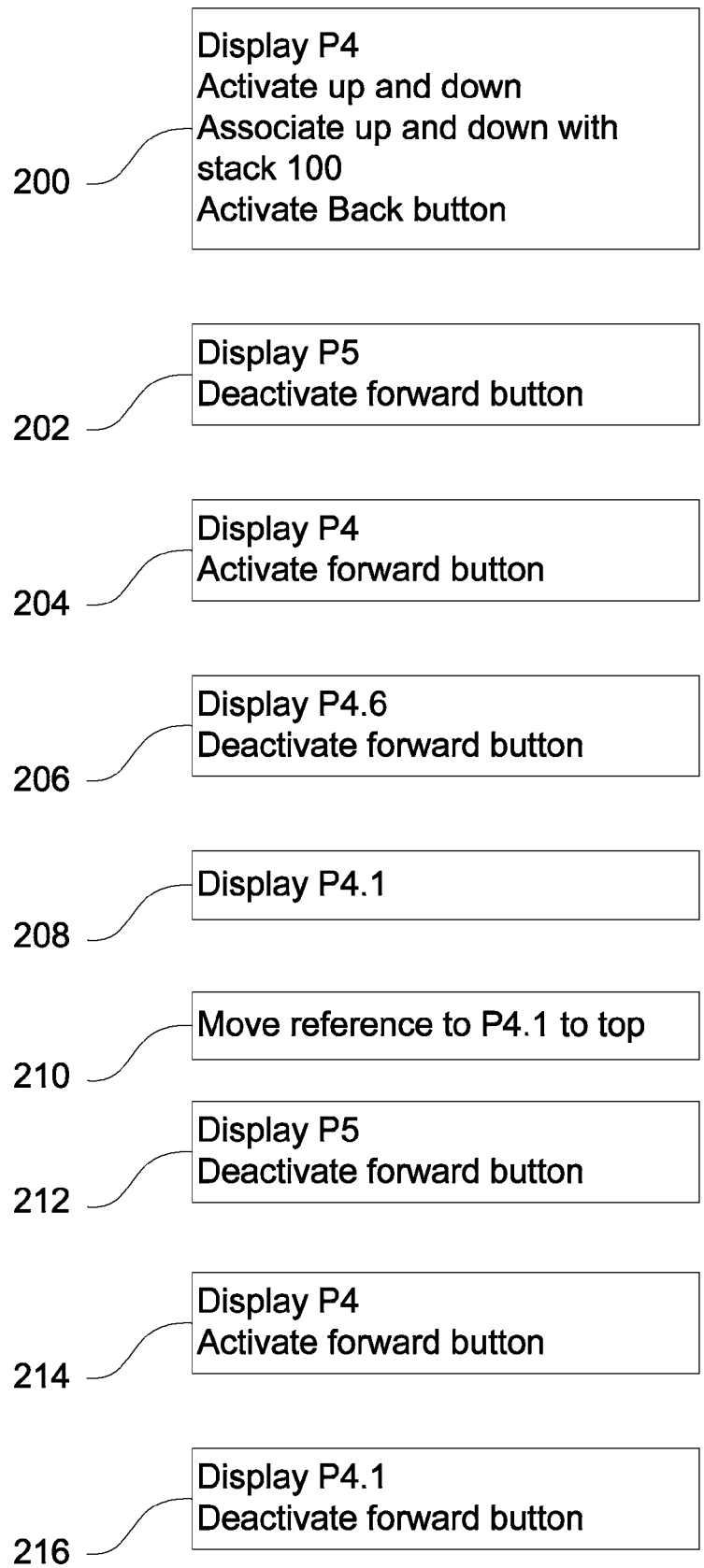
FIG. 2 is a flowchart that illustrates a navigation method according to an example embodiment of the present invention.

FIG. 2 is a flowchart that illustrates a navigation process, subsequent to navigation from page 4 as represented in part (e) of FIG. 1 to page 1. Upon the navigation to page 1, a forward button may be active, a back button may be inactive, and up and down buttons may be inactive. At step 200, in response to selection of the forward button, e.g., by a mouse click, touch-selection, key-entry, or any other suitably appropriate selection method, the processor may display page 4 (which has been moved to the top of forward stack 100 in response to the backward navigation to page 1), activate the back button, activate the up and down buttons, and associate the up and down buttons with the forward stack 100.

The up and down buttons may be displayed between the back and forward buttons. The up button may be displayed immediately above the down button. While the described arrangement is preferable, the buttons may be positioned at other locations. with regard to general location in the displayed window, they may be displayed, for example, at a top-left section of the displayed window, or, for example, any other suitable position within the window. The back button may include a graphically displayed arrow pointing to the left of the window, the forward button may include a graphically displayed arrow pointing to the right of the window, the up button may include a graphically displayed arrow pointing towards the top of the displayed window, and the down button may include a graphically displayed arrow pointing towards the bottom of the window. While the described graphics of the buttons may be preferable, the button may alternatively be displayed without any such arrows. Moreover, in addition to or instead of graphically displayed soft keys, hard keys, such as keyboard keys, e.g., arrow keys of a keyboard, may be used for the back, forward, up, and down keys.

At step 202, in response to selection of the up button while page 4 is displayed due to its display in step 200, the processor may display page 5 (which has been moved to the second position of the forward stack 100 in response to the prior backward navigation to page 1) and deactivate the forward button (assuming that navigation did not previously occur from page 5 to a lower hierarchical page).

At step 204, in response to selection of the down button while page 5 is displayed due to its display in step 202, the processor may redisplay page 4 and activate the forward button (because navigation previously occurred from page 4 to lower hierarchical pages).

At step 206, in response to selection of the forward button while page 4 is displayed due to its display in step 204, the processor may display page 4.6, which is at the top of stack 102 and may deactivate the forward button (assuming that navigation did not previously occur from page 4.6 to a lower hierarchical page).

At step 208, in response to selection of the down button while page 4.6 is displayed due to its display in step 206, the processor may display page 4.1, the forward stack 102 being operated as a ring memory (in the alternative, the down button may be deactivated in step 206 in an embodiment where the stacks are not operated as ring memories, and the up button may similarly be deactivated where page 4.1 is displayed assuming it is referenced at the lowest stack position of stack 102 as shown in part (e) of FIG. 1). The forward button may remain inactive assuming navigation did not previously occur from page 4.1 to a lower hierarchical page.

At step 210, in response to selection of the back button while page 4.1 is displayed due to its display in step 208, the processor may shift the reference to page 4.1 in forward stack 102 to the top most position of the stack 102, the remaining page references that were previously at positions of the stack in the forward stack 102 higher than the reference to page 4.1 being moved down one position. The processor may also redisplay page 4 and activate the forward button. The back, up, and down buttons may remain active. However, the up and down button are now associated with stack 100 instead of stack 102.

At step 212, in response to selection of the up button while page 4 is displayed due to its display in step 210, the processor may display page 5 and deactivate the forward button.

At step 214, in response to selection of the down button while page 5 is displayed due to its display in step 212, the processor may redisplay page 4 and activate the forward button (because navigation previously occurred from page 4 to lower hierarchical pages).

At step 216, in response to selection of the forward button while page 4 is displayed due to its display in step 214, the processor may display page 4.1, which is at the top of stack 102 and may deactivate the forward button (assuming that navigation did not previously occur from page 4.1 to a lower hierarchical page).

In an example embodiment of the present invention, in response to selection of a forward button, instead of displaying the page referenced at the top-most position of the stack of references to pages of the immediate lower hierarchical level than a currently displayed page, the system and method of the present invention may display a list of selectable listings of such pages of lower hierarchical pages. For example, referring to the state represented in part (e) of FIG. 1, where page 4 is displayed, in response to selection of the forward button, the processor may display a listing of pages 4.1-4.8. The listing may be in the form of thumbnail snapshot images, e.g., retrieved from cache memory. In an example embodiment of the present invention, the listing may be according to the order of page references in the stacks as described above with respect to FIG. 1. In alternative example embodiments, other orders may be used, and, according to such example embodiments, the order of page references in the forward stacks may be managed differently than as described above with respect to FIG. 1. However, a plurality of forward stacks may be maintained in memory in order to populate the page listings presented in response to selections of the forward button.

In an example embodiment of the present invention, in response to an initial selection of the forward button, one of the page listings may be graphically presented such that it is indicated to be activated for selection. For example, the listing may be highlighted. The user may use any suitably appropriate input device to change the listing activated for selection. For example, a mouse wheel may be used for this purpose. Alternatively, movement of a mouse cursor over a listing may cause the listing to be activated for selection. In an alternative example embodiment, all listings are presented in the same manner, without graphically indicating which is the listing activated for selection. Instead, the user may determine which is activated for selection based on a position of a graphical mouse cursor, the listing over which the cursor is positioned being the listing activated for selection. In an example embodiment of the present invention, in response to selection of the forward button, the listing may be displayed and graphical up and down buttons may be activated, which up and down keys may be used for changing which of the listings is activated for selection. Alternatively or in addition, keyboard arrow keys may be used for this purpose.

In response to receipt of a selection command, the system and method may navigate forward to the page whose listing was activated. For example, a select button may be selected or the activated listing may be clicked via a mouse click, or a key, e.g., the "enter" key, may be punched while the listing is active, thereby causing the processor to display the page.

Figure 3:
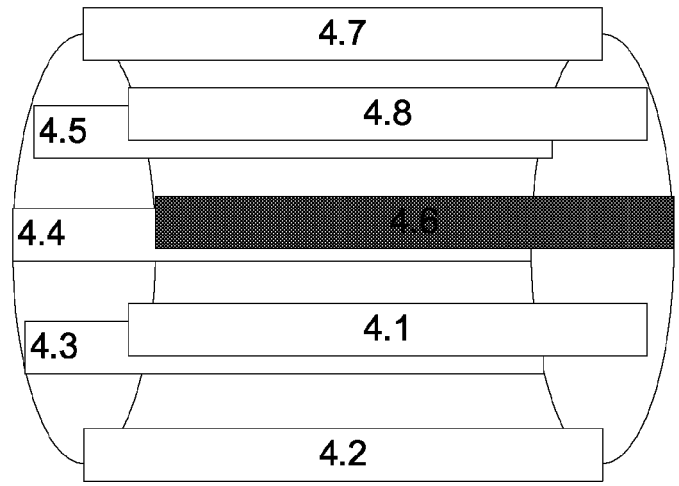
FIG. 3 shows a ring listing according to an example embodiment of the present invention.

FIG. 3 shows a three-dimensional ring listing of pages which may be displayed in response to selection of the forward button. The page referenced by the top most position of the forward stack including the references to the pages listed in the listing may be positioned at a center and forward-most position of the ring. Additionally, or alternatively, the listing may be highlighted. For example, in response to selection of the forward button from the state of part (e) of FIG. 1, page 4.6 may be listed at the center and forward-most position as shown in FIG. 3.

Subsequently, in response to selection of up and down key (graphical keys or hard keys), the three-dimensional ring listing may be accordingly rotated. For example, in response to selection of the up key, the processor may rotate the ring listing upwards to display the listing of page 4.1 at the center and forward-most position and/or may highlight the listing of page 4.1. On the other hand, where the listing of 4.6 is highlighted, in response to selection of the down key, the processor may rotate the ring listing in the opposite direction, downwards, to display the listing of page 4.8 at the center forward-most position and/or may highlight the listing of page 4.8.

In an example embodiment of the present invention, instead of rotating the ring listing, the ring listing may remain stationary, and, for example, highlighting may be to page listings at different positions within the ring listing. For example, in response to multiple commands to traverse through the stack of page references, the highlighted listed may be the one positioned behind the forward-most displayed listing.

In an example embodiment of the present invention, in response to selection of the forward button, the system and method may display a plurality of three-dimensional ring listings, each corresponding to a respective lower hierarchical level of pages. For example, upon rotating the ring-listing to activate page 4.8 for selection, a further ring listing may be displayed to display listings of pages of lower hierarchical level than page 4.8 which were previously navigated to from page 4.8. For example, referring to FIG. 1, since the only navigation from page 4.8 to pages of lower hierarchical level was to page 4.8.1, only the listing of page 4.8.1 would be displayed adjacent the ring listing of pages 4.1-4.8. Rotation of the ring listing may be limited to that of the highest hierarchical ring listing. In response to such rotation, the system and method may change the ring listings of lower hierarchical levels, the listings of lower hierarchical levels corresponding to the activated one of the listings of the level immediately below the hierarchical level of the page displayed when the forward button was selected. Accordingly, if the ring display is rotated to move page 4.1 to the center and forward-most position of the ring listing, the lower listing including the listing of page 4.8.1 may be removed, and may be replaced with another listing of pages of lower hierarchical level navigated to from page 4.1 (if there was such a navigation).

In an example embodiment, each lower hierarchical listing may include at its respective center and/or forward-most position the listing of the page referenced at the top of the forward stack corresponding to that hierarchical level. For example, had the forward button been selected while page 1 was displayed, the first ring listing may include listings of pages 2 to 5. If that ring listing is rotated such that the listing of page 4 is at the forward-most position, then the processor would display the ring listing of FIG. 3, with page 4.6 listed at the forward-most position since it is at the top of forward stack 102.

In an example embodiment, the user may select listing even lower hierarchical page listings to change which listings of even lower hierarchical level are displayed. For example, if the forward button is selected while page 1 is displayed, and the hierarchically highest ring listing is manipulated for display of the listing of page 4 at the forward-most position, the ring listing corresponding to stack 102 may be displayed with the listing of page 4.6 at the forward-most position. A listing corresponding to forward stack 104 would therefore not be displayed. According to this example embodiment, the user may select the listing of page 4.8, in response to which the processor may rotate, in the graphical user interface (GUI) presented in the display device, the listing corresponding to forward stack 100 to display the listing of page 4.8 at the forward-most position (and may highlight the listing of page 4.8), and may additionally responsively display the ring listing corresponding to forward stack 104. By thus viewing the different lower hierarchical pages to which the user may forward navigate, the user may better determine which of the hierarchically higher pages to select for forward navigation. In an example embodiment, the number of lower higher hierarchical levels for which ring listings are presented in response to selection of the forward button may be limited to a predetermined number of levels in order not to clutter the screen. For example, the number of the levels may be limited to three.

For building the ring listing, where the stack to which the ring listing corresponds includes just a single reference, the single reference may be added to a forward-most position, the building of the listing being concluded. Where the stack includes two listings, the first may be positioned at the forward-most position and the second above it or behind it. Where the stack includes three listings, the first may be positioned at the forward-most position, the second at the topmost position, and the third behind the first listing. Where the stack includes four or more listings, if there are an even number N of listings, the first may be positioned at the forward-most position, the ((N/2)+1)th listing may be positioned behind the first listing, those between the first and the ((N/2)+1)th listing that are at a higher position in the stack than the ((N/2)+1)th listing may be positioned between the first and the ((N/2)+1)th listing at the top side of the ring listing, and those between the first and the ((N/2)+1)th listing that are at a lower position than the ((N/2)+1)th listing may be positioned between the first and the ((N/2)+1)th listing at the bottom side of the ring listing. Where the stack includes five or more listings, if there are an odd number N of listings, the first listing may be positioned at a center forward-most position, the two whole number listing surrounding the value of ((N/2)+1) may be listed about the center line behind the first listing, and the rest may be positioned as described above with respect to the even number of listings. For example, where there are five listings, the first may be positioned at the center and forward-most position. The third and fourth may be positioned about the axis formed by the center line behind the forward most position because (5/2)+1=3.5. The second may be positioned at the top side of the ring listing between listings 1 and 3, and the fifth may be positioned at the bottom side of the ring listing between listings 1 and 4. Other suitably appropriate list building methods may be used in the alternative.

The features described above with respect to simultaneous display of multiple ring listings for a plurality of hierarchical levels may similarly be applied in an example embodiment in which flat listings, instead of ring listings, are presented. For each flat listing, one of the listings may be activated for selection. For example, instead of rotating a ring listing, the listing may remain stationary, and the page listings within the flat listing may remain stationary. Upon selection of an up or down key, for example, different listings in the flat listing may be highlighted to indicate its activation for selection. Alternatively, a user may, for example, position a mouse pointer at any of the listings and select the listing, without moving the selected listing's position in the flat listing. With respect to this embodiment as well, highlighting of the listing activated for selection is not required. For a listing that is activated for selection, further flat listings of pages of a lower hierarchical level than the listing activated for selection may be displayed, as described above with respect to ring listings.

The description above with respect to the up and down directions may be reversed. For example, referring to FIG. 2, the down button may be used to navigate to lower parts of the stack and the up button for navigating to higher parts of the stack. Similarly, with respect to FIG. 3, the listing corresponding to the second highest position of the stack may be below the listing corresponding to the top-most position of the stack, where the listing corresponding to the top-most position of the stack is activated for selection.

The navigation referred to above may be with respect to webpages in a web browser. The stacks may be stored on a web session by web session basis, e.g., where a session corresponds to navigation in a single tab of a single navigation window.

It is noted that a reference to a particular page may be stored in multiple stacks. For example, referring to FIG. 1, if a user navigates forward from page 4.8 to page 4, e.g., via selection of a link to page 4 or manual entry of the Uniform Resource Locator (URL) of page 4, page 4 may be stored in both stack 100 and stack 104.

In example embodiments of the present invention, stacks, such as described with respect to FIG. 1, may be used for undo and redo operations, for redoing operations of parallel branches of an editing history, in an editing tool, e.g., of a word processor or other document creation and/or data manipulation application, such as a spreadsheet application. For example, the references in stacks 100, 102, and 104 may be to editing operations. In response to each edit, the back stack 110, which may be operated as the undo stack, may be updated to include the prior operations leading to the present state. In response to an undo command, the top most reference of the undo stack 110 may be removed.

According to this example embodiment, in response to a redo command from the state corresponding to operation 4, the system and method may display a selectable list of possible operations to redo, including listings of operations 4.1-4.8, the listings being listed according to the order in which the corresponding references are stored in stack 102. If the reference to 4.8 is at the top of stack 102 when the user selects operation 4.6 from the displayed list, the reference to operation 4.6 is moved to the top of stack 102, each of the other references previously above operation 4.6 moving down one position in stack 102.

For undoing an operation, the system and method may, for example, run through and implement all of the operations of the back stack leading to the operation referenced at the top-most position of the back stack.

In an alternative example embodiment of the present invention, instead of displaying a list of selectable operation listings for possible redo operations, the parallel redo branches may be provided similar to the method described with respect to webpage navigation in conjunction with FIG. 2. In response to a redo command, the processor may initially apply an operation at top position of a redo stack associated with the current state of the document. In response to, for example, an up button, the processor may undo the operation referenced by the top position of the redo stack, and redo the operation of the second position of the redo stack. In response a subsequent undo command, the reference previously stored at the second position may be moved to the top of the stack, as described above with respect to webpage navigation.

Additionally, as described above with respect to webpage navigation, in an example embodiment of the present invention, a reference to a redo operation may be moved to the top of the redo stack additionally in response to a further redo command after the redo operation is applied, to reapply a further downstream operation, or in response to an undo operation after such reapplication of the further downstream operation.

Figure 4:
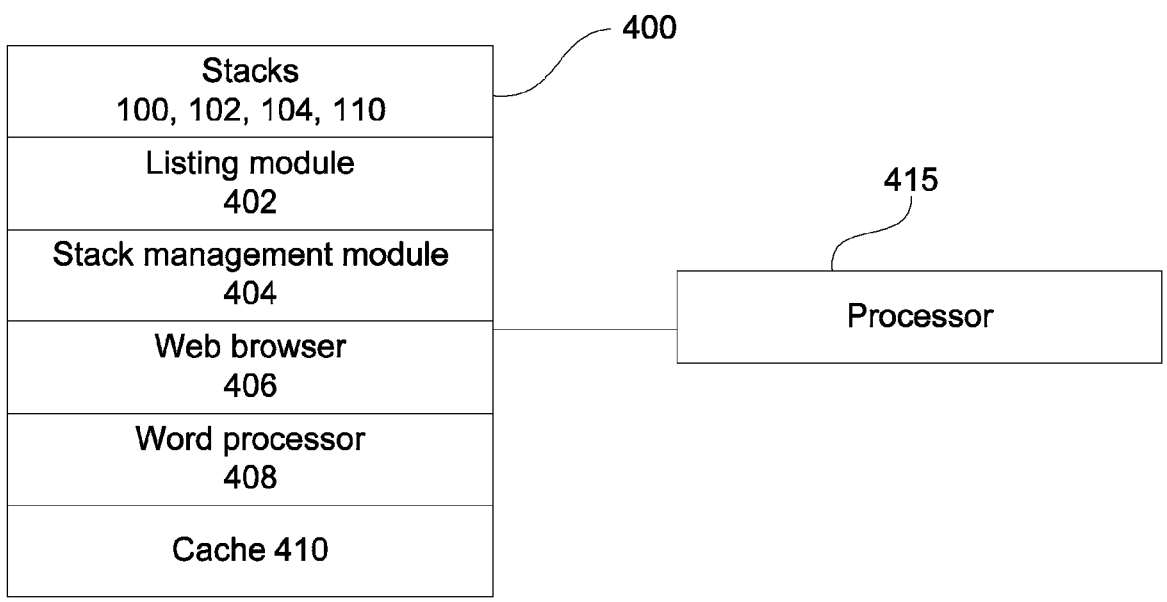
FIG. 4 shows a system according to an example embodiment of the present invention.

FIG. 4 illustrates a system according to an example embodiment of the present invention. A memory 400 may include forward (redo) and back (undo) stacks 100, 102, 104, and 110 described above, a listing module 402 for generating page listings in response to selection of a forward button or manipulations of listings displayed in response to prior selection of the forward button., as described above, a stack management module 404 for storing references to pages and/or operations in stacks and for updating the order of the references in the stacks, as described above, a web browser 406 for navigating webpages in accordance with the methods described above, a word processor 408 (or other document generation and/or data manipulation application) for performing word processing (or other data manipulation), e.g., with the undo and redo operations described above, and/or a cache 410 for storing cached copies of visited webpages, as described above. The system may further include a processor 415 which may execute the listing module 402, the stack management module 404, the web browser 406, and/or the cache 410. The processor 415 may further update the stacks 100, 102, 104, and 110 and the cache 410 via the execution of the above-referenced modules.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. Such devices may be used for navigating pages along parallel history branches and/or for redoing edits along parallel redo branches.

An example embodiment of the present invention is directed to one or more hardware computer-readable media, e.g., as described above, having stored thereon instructions executable by a processor to perform the various methods described herein, each alone or in combination.

An example embodiment of the present invention is directed to a method, e.g., of a hardware component or machine, of transmitting instructions executable by a processor to perform the methods described herein, alone or in combination.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented media navigation method, comprising:
for a first page of a first hierarchical level, a computer processor storing in memory a respective stack of references to pages of a second hierarchical level lower than the first hierarchical level previously navigated to directly from the first page;
for a predefined navigation from the first page directly to a particular page of the second hierarchical level:
if the stack does not include a reference to the particular page, adding, by the processor, the reference to the particular page to a top of the stack, all other page references of the stack being pushed back one position in the stack;
if the stack includes the reference to the particular page at a position lower than the top of the stack of page references, shifting, by the processor, the reference to the particular page from its position to the top of the stack; and
if the stack includes the reference to the particular page at the top of the stack, leaving the stack unmodified; and
subsequent to the predefined navigation:
navigating, by the processor, from the particular page to the first page; and
subsequently responding, by the processor, to an instruction to navigate from the first page to a hierarchically lower page in accordance with the stack;
wherein:
the responding includes displaying a list of the pages of the second hierarchical level referenced by the stack;
the list is presented in a first three-dimensional ring;
where the instruction to navigate is of a first instruction type, the responding includes traversing the top of the stack;
where the instruction to navigate is of a second instruction type, the responding includes traversing one position lower in the stack than a previous traversed position of the stack;
the instruction of the second instruction type for navigation from the first page to a page of the second hierarchical level is repeatedly inputtable in succession, each successive input of the instruction of the second instruction type causing further traversal of the stack, one position lower for each of the successive inputs;
the page referenced by the traversed position of the stack is listed at a forward-most position of the first three-dimensional ring, the list rotating for each of the successive inputs;
the method further comprises:
for the page referenced by the traversed position of the stack, simultaneously displaying with the first three-dimensional ring and responsive to the traversal of traversed position of the stack (a) a second three-dimensional ring list of pages of a third hierarchical level lower than the second hierarchical level previously directly navigated to from the page referenced by the traversed position of the stack, and (b) a third three-dimensional ring list of pages of a fourth hierarchical level lower than the third hierarchical level, previously directly navigated to from a page that corresponds to a top stack position of a stack of pages that had been directly navigated to from the page referenced by the traversed position of the stack, such that with each change in traversed position caused by responding to the instruction to navigate, three-dimensional ring lists of pages of the third and fourth hierarchical levels that are displayed simultaneously with the first three-dimensional ring dynamically changes; and
for the simultaneous display of the three-dimensional ring lists, the processor is configured to automatically determine for each of the rings which page to reference in a foremost position of the respective ring based on an order of prior page navigation, regardless of prior manipulation of the page references of the rings.

2. The method of claim 1, further comprising:
highlighting the page referenced by the traversed position.

3. The method of claim 1, further comprising:
caching in a cache memory the pages of the second hierarchical level to which references are stored in the stack, wherein the pages of the second hierarchical level are listed in the respective ring of the second hierarchical level as thumbnail images based on the cache memory.

4. The method of claim 1, wherein:
the pages are webpages;
for each of the stacks, the respective top stack position of the respective stack is populated with a reference to a last webpage, of the respective hierarchical level and navigation string to which the respective stack corresponds, that had been displayed in a web browser window; and
the respective forward-most positions of the second and third three-dimensional rings are populated dependent on the respective top stack positions of the respective ones of the stacks of the third and fourth hierarchical levels corresponding to the traversed stack position of the second hierarchical level.

5. A computer-implemented media navigation method, comprising:

for a first page of a first hierarchical level of a page navigation hierarchy, a computer processor storing in memory a respective stack of references to pages of a second hierarchical level lower than the first hierarchical level previously navigated to directly from the first page;

for a predefined navigation from the first page directly to a particular page of the second hierarchical level:

if the stack does not include a reference to the particular page, adding, by the processor, the reference to the particular page age to a top of the stack, all other page references of the stack being pushed back one position in the stack;

if the stack includes the reference to the particular page at a position lower than the top of the stack of page references, shifting, by the processor, the reference to the particular page from its position to the top of the stack; and if the stack includes the reference to the particular page at the top of the stack, leaving the stack unmodified; and subsequent to the predefined navigation:

navigating, by the processor, from the particular page to the first page; and subsequently responding, by the processor, to an instruction to navigate from the first page to a hierarchically lower page in accordance with the stack;

wherein:

the instruction to navigate is of a first instruction type and the responding includes displaying a page of the second hierarchical level referenced by the reference stored at the top of the stack;

the method further comprises, subsequent to the responding to the instruction of the first instruction type, responding to an instruction, of a second instruction type, to navigate from the page of the second hierarchical level that had been displayed in response to the instruction of the first instruction type, the responding to the instruction of the second instruction type including:

moving one position lower in the stack; and displaying a page of the second hierarchical level referenced by the reference stored at the one position lower in the stack;

input of the instruction of the second instruction type for navigation is according to a condition by which the input is enabled only if:

the instruction of the first instruction type has been input while the first page was active; and one of (a) the input of the instruction of the second instruction type has been input while the page navigated to in response to the first instruction type was active and (b) the input of the instruction of the second instruction type occurs while a page navigated to in response to a prior input of the second instruction type is active;

the condition is such that the instruction of the second instruction type is never enabled when a presently displayed page is a root page of the hierarchy;

each input of the second instruction type, when the second instruction type is enabled, is responded to by navigating from a presently displayed page to another page that is of a same hierarchical level as that of the presently displayed page; and the instruction of the second instruction type for navigation to a page of the second hierarchical level is repeatedly inputtable in succession, each successive input of the instruction of the second instruction type causing further traversal of the stack, one position lower for each of the successive inputs.

6. The method of claim 5, wherein the stack is within a ring memory, and, the method further includes, in response to input of the instruction of the second instruction type after reaching the lowest position of the stack, traversing around the ring memory back to the top of the stack.

7. The method of claim 6, further comprising:

in response to input of an instruction of a third instruction type, traversing the ring memory in an opposite direction than the traversal performed in response to the instruction of the second instruction type, and displaying a page referenced by a traversed position of the ring memory.

8. The method of claim 5, wherein, in response to input of the instruction of the first instruction type while the displayed page of the second hierarchical level is displayed, a page of a third hierarchical level lower than the second hierarchical level is displayed, subsequent successive input of instructions of the second instruction type causing traversal to lower positions of a stack of references to pages of the third hierarchical level.

9. The method of claim 8, wherein, while a page of the third hierarchical level is displayed, input of a navigation instruction of a third instruction type causes redisplay of a page of the second hierarchical level, a subsequent input of the instruction of the second instruction type causing traversal of the stack of references to the pages of the second hierarchical level.

10. The method of claim 9, wherein the instruction of the third instruction type is input by selecting a back button.

11. The method of claim 10, wherein the back button depicts an arrow pointing to a left side of a window.

12. The method of claim 5, wherein the instruction of the first instruction type is input by selecting a forward button and the instruction of the second instruction type is input by selecting an up button, the up button not being selectable if the currently displayed page is the root page of the hierarchy.

13. The method of claim 12, wherein the forward and up buttons are displayed in a four-button cluster including the forward button that depicts an arrow pointing to a right side of a window, the up button that depicts an arrow pointing to an upper part of the window, a back button that depicts an arrow pointing to a left side of the window, and a down button that depicts an arrow pointing to a bottom part of the window, the up and down buttons being selectable for navigating between pages of a same hierarchical level as each other.

14. The method of claim 5, wherein the pages are webpages.

15. A non-transitory computer-readable medium on which are stored instructions executable by a processor, the instructions which, when executed by the processor, cause the processor to perform a media navigation method, the method comprising:

for a first page of a first hierarchical level, storing in memory a respective stack of references to pages of a second hierarchical level lower than the first hierarchical level previously navigated to directly from the first page;

for a predefined navigation from the first page directly to a particular page of the second hierarchical level:

if the stack does not include a reference to the particular page, adding the reference to the particular page to a top of the stack, all other page references of the stack being pushed back one position in the stack;

if the stack includes the reference to the particular page at a position lower than the top of the stack of page references, shifting the reference to the particular page from its position to the top of the stack; and if the stack includes the reference to the particular page at the top of the stack, leaving the stack unmodified; and subsequent to the predefined navigation:
navigating from the particular page to the first page; and
subsequently responding to an instruction to navigate from the first page to a hierarchically lower page in accordance with the stack;

wherein:
the instruction to navigate is of a first instruction type and the responding includes displaying a page of the second hierarchical level referenced by the reference stored at the top of the stack;

the method further comprises, subsequent to the responding to the instruction of the first instruction type, responding to an instruction, of a second instruction type, to navigate from the page of the second hierarchical level that had been displayed in response to the instruction of the first instruction type, the responding to the instruction of the second instruction type including:
moving one position lower in the stack; and
displaying a page of the second hierarchical level referenced by the reference stored at the one position lower in the stack;

input of the instruction of the second instruction type for navigation is according to a condition by which the input is enabled only if:
the instruction of the first instruction type has been input while the first page was active; and
one of (a) the input of the instruction of the second instruction type has been input while the page navigated to in response to the first instruction type was active and (b) the input of the instruction of the second instruction type occurs while a page navigated to in response to a prior input of the second instruction type is active;

the condition is such that the instruction of the second instruction type is never enabled when a presently displayed page is a root page of the hierarchy;

each input of the second instruction type, when the second instruction type is enabled, is responded to by navigating from a presently displayed page to another page that is of a same hierarchical level as that of the presently displayed page; and the instruction of the second instruction type for navigation to a page of the second hierarchical level is repeatedly inputtable in succession, each successive input of the instruction of the second instruction type causing further traversal of the stack, one position lower for each of the successive inputs.

* * * * *